United States Patent
Nagamoto

(10) Patent No.: US 8,971,016 B1
(45) Date of Patent: Mar. 3, 2015

(54) MONOLITHIC CERAMIC CAPACITOR

(71) Applicant: Murata Manufacturing Co., Ltd., Nagaokakyo-shi, Kyoto-fu (JP)

(72) Inventor: Toshiki Nagamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/520,425

(22) Filed: Oct. 22, 2014

(51) Int. Cl.
   *H01G 4/06* (2006.01)
   *H01G 4/228* (2006.01)
   *H01G 4/30* (2006.01)
   *H01G 4/008* (2006.01)

(52) U.S. Cl.
   CPC . *H01G 4/30* (2013.01); *H01G 4/008* (2013.01)
   USPC ............. 361/311; 361/301.4; 361/321.1; 361/321.2

(58) Field of Classification Search
   CPC ........... H01G 4/018; H01G 4/06; H01G 4/08; H01G 4/30
   USPC .............. 361/301.4, 311, 321.1, 321.2, 321.5
   See application file for complete search history.

(56) References Cited

U.S. PATENT DOCUMENTS

2012/0069487 A1*  3/2012  Noguchi et al. ........... 361/301.4
2013/0100576 A1*  4/2013  Seo et al. .................. 361/301.4

FOREIGN PATENT DOCUMENTS

JP      58-011565 A    1/1983
JP      06-176956 A    6/1994

* cited by examiner

*Primary Examiner* — Jenny L Wagner
*Assistant Examiner* — Dion R Ferguson
(74) *Attorney, Agent, or Firm* — Keating & Bennett, LLP

(57) ABSTRACT

A monolithic ceramic capacitor includes an outer electrode arranged on a ceramic element body including inner electrodes, and a dielectric layer present between a pair of the inner electrodes adjacent in a stacking direction and extending to one of a pair of end surfaces of the ceramic element body that defines an inter-electrode dielectric layer. A gap extending in a direction connecting the inner electrodes sandwiching the inter-electrode dielectric layer is present in about 5% to about 90% of inter-electrode dielectric layers in the ceramic element body at a position near or adjacent to at least one of the pair of end surfaces of the ceramic element body.

6 Claims, 7 Drawing Sheets

MONOLITHIC CERAMIC CAPACITOR

BACKGROUND OF THE INVENTION

1. Field of the Invention

The present invention relates to monolithic ceramic capacitors, and more specifically relates to a monolithic ceramic capacitor including an outer electrode arranged on a ceramic element body including an inner electrode that is connected to the outer electrode.

2. Description of the Related Art

One of representative monolithic ceramic electronic components is, for example, a monolithic ceramic capacitor disclosed in Japanese Unexamined Patent Application Publication No. 6-176956.

As shown in FIG. 4, the monolithic ceramic capacitor has a structure in which a pair of outer electrodes 104 (104a, 104b) are arranged on a pair of end surfaces 103 (103a, 103b) of a ceramic multilayer body (ceramic element body) 110 having a plurality of inner electrodes 102 (102a, 102b) stacked intermittently with ceramic layers 101 serving as dielectric layers. Plated films 105 of, for example, Ni and Sn are formed on the surfaces of the outer electrodes 104 (104a, 104b).

Also, the outer electrodes 104 (104a, 104b) are formed by applying conductive paste, in which a metal conductor and a glass composition are blended according to a predetermined ratio, to the ceramic element body and baking the conductive paste.

Also, in Japanese Unexamined Patent Application Publication No. 6-176956, by dispersing glass having a predetermined composition in the outer electrodes, it is expected to increase resistance to mechanical stress and thermal shock from the outside.

However, in the case of the above-described monolithic ceramic capacitor, when the conductive paste for forming the outer electrodes is baked in a manufacturing process thereof, the inner electrodes 102 may expand in a stacking direction (thickness direction or T direction) of the inner electrodes 102 and a width direction (direction orthogonal to a direction in which the inner electrodes extend or W direction) of the inner electrodes 102. Due to the expansion, for example, as schematically shown in FIG. 5, when viewed from the end surface 103 side of the capacitor element body 110, a crack 111 may be generated so as to extend from a corner portion of the effective region, in which the plurality of inner electrodes 102 are stacked with the ceramic layers 101 and which contributes to generation of capacitance, to a corner portion of the ceramic element body 110. Thus, reliability is decreased.

SUMMARY OF THE INVENTION

Accordingly, preferred embodiments of the present invention provide a highly reliable monolithic ceramic capacitor that restricts or prevents generation of a crack in a ceramic element body such as a crack caused by expansion of an inner electrode.

According to a preferred embodiment of the present invention, a monolithic ceramic capacitor includes a ceramic element body including a plurality of dielectric layers made of dielectric ceramic, and a plurality of inner electrodes stacked with the dielectric layers and alternately extending to a pair of mutually opposite end surfaces of the ceramic element body; and a pair of outer electrodes arranged on outer surfaces of the ceramic element body and electrically connected to respective ones of the inner electrodes. Assuming that a dielectric layer sandwiched between a pair of inner electrodes among a plurality of inner electrodes extending to one of the pair of end surfaces of the ceramic element body is an inter-electrode dielectric layer, a gap extending in a direction connecting the inner electrodes sandwiching the inter-electrode dielectric layer is present.

The gap preferably has a width extending in a direction perpendicular or substantially perpendicular to the direction connecting the inner electrodes sandwiching the inter-electrode dielectric layer (e.g., along a length of the inter-electrode dielectric layer). The width of the gap preferably is not less than about 0.2 µm and not more than about 2 µm, for example.

The gap may be filled with air or a material of the inner electrodes or outer electrodes, for example, Ni or an Ni—Cu alloy, for example.

The gap may continuously extend from one of the pair of the inner electrodes to the other so as to pass entirely through the inter-electrode dielectric layer located therebetween. In other words, the inter-electrode dielectric layer may be completely separated by the gap extending entirely through the inter-electrode dielectric layer so that the inter-electrode dielectric layer is divided into a left portion and a right portion separated from each other along a direction connecting the pair of end surfaces.

Alternatively, the gap may extend in the direction connecting the inner electrodes sandwiching the inter-electrode dielectric layer only partially along the inter-electrode dielectric layer and may be discontinuous. In other words, the inter-electrode dielectric layer is only partially separated by the gap extending only partially through the inter-electrode dielectric layer along the direction connecting the inner electrodes sandwiching the inter-electrode dielectric layer.

It possible that more than one gap is formed and present in the same inter-electrode dielectric layer.

Preferably the gap is located at a position near or adjacent to at least one of the pair of the end surfaces of the ceramic element body, in about 5% or greater of inter-electrode dielectric layers among a plurality of the inter-electrode dielectric layers included in the ceramic element body.

Also, a monolithic ceramic capacitor according to a preferred embodiment of the present invention includes a ceramic element body including a plurality of dielectric layers made of dielectric ceramic, and a plurality of inner electrodes stacked with the dielectric layers and alternately extending to a pair of mutually opposite end surfaces of the ceramic element body; and a pair of outer electrodes arranged on outer surfaces of the ceramic element body and electrically connected to respective ones of the inner electrodes. Assuming that a dielectric layer sandwiched between a pair of inner electrodes among a plurality of inner electrodes extending to one of the pair of end surfaces of the ceramic element body is an inter-electrode dielectric layer, a gap in a direction connecting the inner electrodes sandwiching the inter-electrode dielectric layer is located at a position within a distance of about 10 µm from at least one of the pair of the end surfaces of the ceramic element body in about 5% to about 90% of inter-electrode dielectric layers among a plurality of the inter-electrode dielectric layers included in the ceramic element body.

Also, a monolithic ceramic capacitor according to a preferred embodiment of the present invention includes a ceramic element body including a plurality of dielectric layers made of dielectric ceramic, and a plurality of inner electrodes including Ni and being stacked with the dielectric layers, the inner electrodes alternately extending to a pair of mutually opposite end surfaces of the ceramic element body; and a pair of outer electrodes including Cu and being arranged on outer surfaces of the ceramic element body and electrically connected to respective ones of the inner electrodes; wherein a number of the plurality of the dielectric layers is about 200 sheets to about 400 sheets; Cu included in the outer electrodes is diffused in Ni included in the inner electrodes at a position near or adjacent to at least one of the pair of end surfaces of the ceramic element body; and assuming that a dielectric layer sandwiched between a pair of inner electrodes among a plurality of inner electrodes extending to one of the pair of end surfaces of the ceramic element body is an inter-electrode dielectric layer, a thickness of the inter-electrode dielectric layer is about 1.5 μm to about 4 μm at a position near or adjacent to at least one of the pair of end surfaces of the ceramic element body, a gap in a direction connecting the inner electrodes sandwiching the inter-electrode dielectric layer is located at a position within a distance of about 10 μm from at least one of the pair of the end surfaces of the ceramic element body in about 5% to about 90% of inter-electrode dielectric layers among a plurality of the inter-electrode dielectric layers included in the ceramic element body.

Since the gap in the direction connecting the inner electrodes sandwiching the inter-electrode dielectric layer preferably is present at the position near or adjacent to at least one of the pair of end surfaces of the ceramic element body in about 5% to about 90% of the inter-electrode dielectric layers among the plurality of inter-electrode dielectric layers, the inner electrodes easily expand in the length direction (L direction) of the capacitor element body, and expansion of the inner electrodes in the stacking direction (thickness direction nor T direction) of the inner electrodes and the width direction (the direction perpendicular or substantially perpendicular to the direction in which the inner electrodes extend or W direction) of the inner electrodes is further reliably restricted or prevented. Accordingly, generation of a crack from a corner portion of the effective region, in which the inner electrodes are alternately stacked with the inter-electrode dielectric layers and which contributes to generation of capacitance, to a corner portion of the ceramic element body is reliably restricted or prevented.

A monolithic ceramic capacitor according to a preferred embodiment of the present invention is configured such that a rectangular or substantially rectangular-parallelepiped-shaped ceramic element body including a plurality of dielectric layers and a plurality of inner electrodes stacked in a stacking direction, and including a pair of mutually opposite end surfaces, to which the inner electrodes extend, and four side surfaces connecting the pair of end surfaces, is provided with a pair of outer electrodes connected to respective ones of the inner electrodes. Assuming a dielectric layer sandwiched between a pair of inner electrodes adjacent to each other in the stacking direction among a plurality of inner electrodes extending to one of the pair of end surfaces of the ceramic element body is an inter-electrode dielectric layer, a gap in a direction connecting the inner electrodes sandwiching the inter-electrode dielectric layer is present at a position near or adjacent to at least one of the pair of end surfaces of the ceramic element body in about 5% or more of inter-electrode dielectric layers among a plurality of the inter-electrode dielectric layers included in the ceramic element body. Accordingly, expansion of the inner electrodes in the length direction (L direction) of the capacitor element easily occurs, and expansion of the inner electrodes in the stacking direction (thickness direction or T direction) of the inner electrodes and the width direction (in a direction perpendicular or substantially perpendicular to the direction in which the inner electrode extends or W direction) is restricted or prevented.

Consequently, generation of a crack from a corner portion of the effective region, in which the inner electrodes are alternatingly stacked with the inter-electrode dielectric layers and which contributes to generation of capacitance, in the ceramic element body, due to expansion of the inner electrodes in the WT directions (width direction and thickness direction) of the ceramic element body, is restricted or prevented, and hence a monolithic ceramic capacitor with high reliability is provided.

With the preferred embodiments of the present invention, the gap in the direction connecting the inner electrodes sandwiching the inter-electrode dielectric layer is preferably located in a region near or adjacent to the end surface, within about 10 μm from the end surface of the ceramic element body, for example.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are described below with reference to the drawings.

Figure 1:
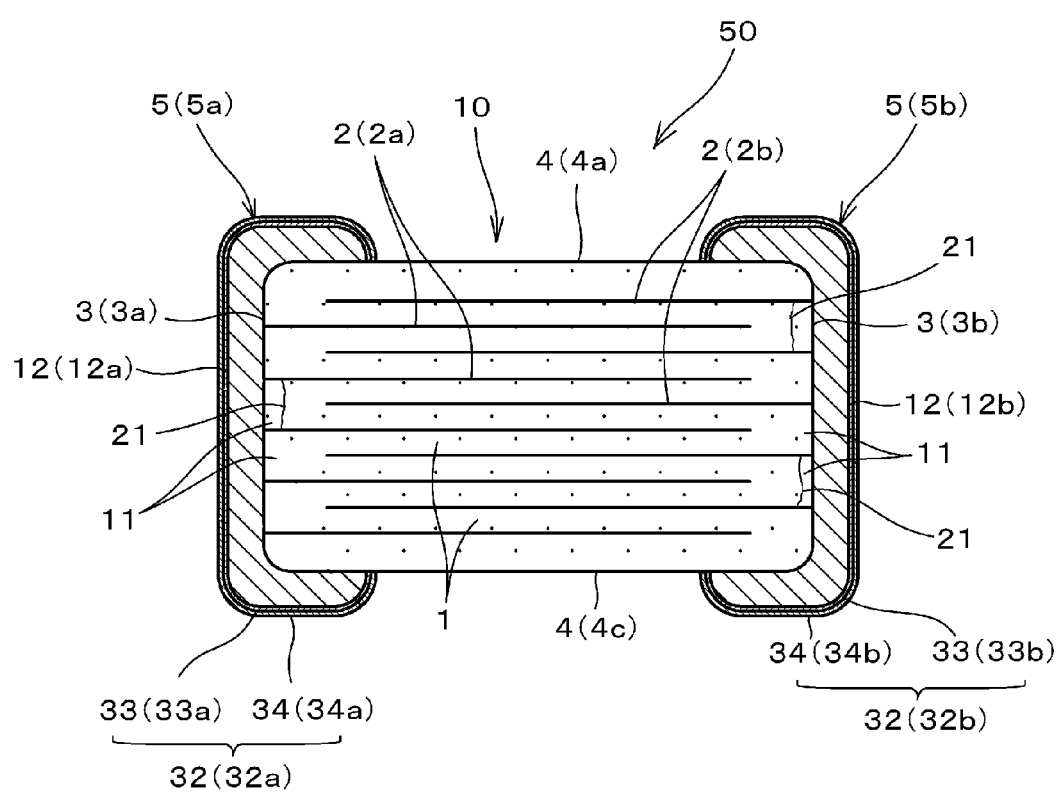
FIG. 1 is a front cross-sectional view showing a configuration of a monolithic ceramic capacitor according to a preferred embodiment of the present invention.
Figure 2:
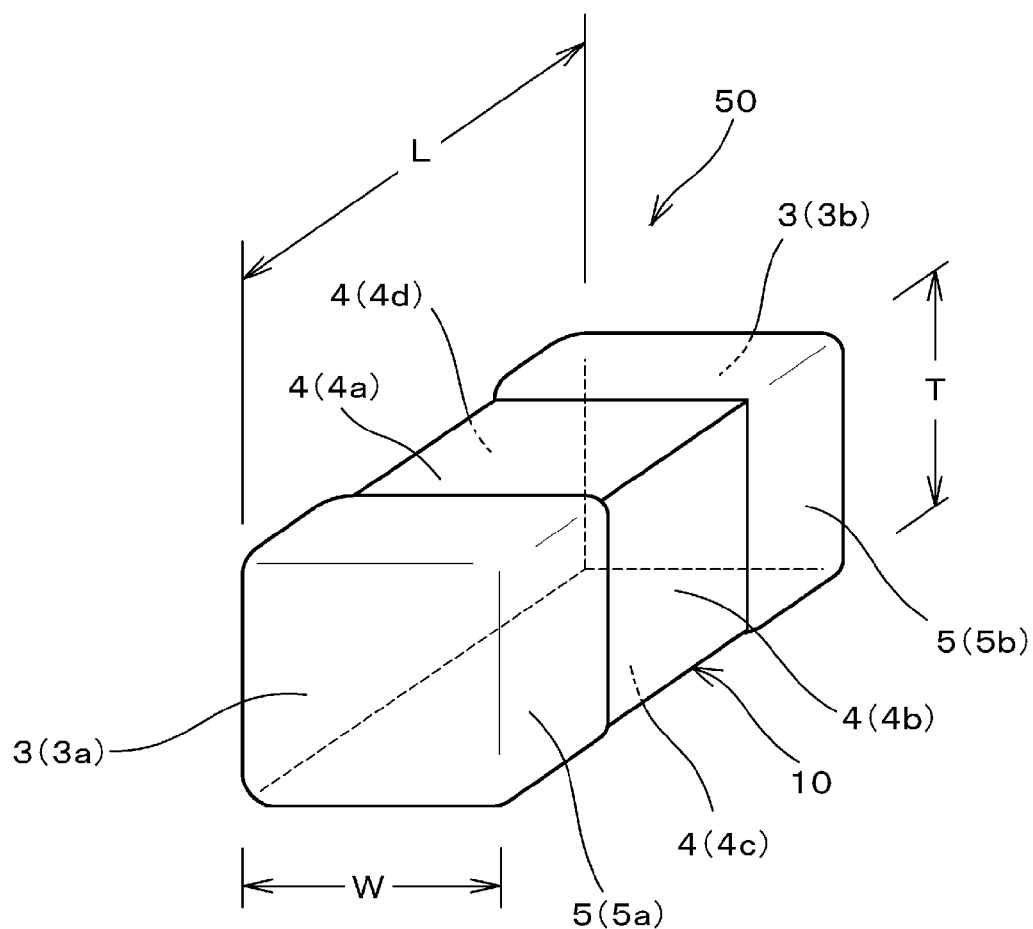
FIG. 2 is a perspective view showing an external configuration of the monolithic ceramic capacitor according to a preferred embodiment of the present invention.

FIG. 1 is a front cross-sectional view showing a configuration of a monolithic ceramic capacitor 50 according to a preferred embodiment (first preferred embodiment) of the present invention. FIG. 2 is a perspective view showing an external configuration of the monolithic ceramic capacitor 50.

The monolithic ceramic capacitor 50 includes a ceramic element body 10 including a dielectric layer 1 made of dielectric ceramic and a plurality of inner electrodes 2 (2a, 2b) stacked with the dielectric layer 1, and a pair of outer electrodes 5 (5a, 5b) arranged on outer surfaces of the ceramic element body 10 to be connected to respective ones of the inner electrodes 2 (2a, 2b).

The ceramic element body 10 preferably has a rectangular or substantially rectangular parallelepiped shape and includes a pair of mutually opposite end surfaces 3 (3a, 3b), and four side surfaces 4 (4a, 4b, 4c, 4d) connecting the end surfaces 3a and 3b.

In the ceramic element body 10, the dielectric layer (ceramic layer) 1 and the inner electrodes 2 (2a, 2b) are alternately stacked. The inner electrodes 2 (2a, 2b) adjacent to each other in the stacking direction alternately extend to the opposite end surfaces 3 (3a, 3b). The number of the dielectric layers is preferably, but not limited to, about 200 sheets to about 400 sheets, for example.

The outer electrodes 5a and 5b each extend from the end surface 3 (3a, 3b) of the ceramic element body 10 to at least one of the side surfaces 4 (4a, 4b, 4c, 4d) (in this preferred embodiment, being configured to extend all the four side surfaces 4a, 4b, 4c, and 4d).

In this case, when it is assumed that a direction connecting the pair of end surfaces 3a and 3b of the ceramic element body 10 is a length L direction, a direction perpendicular or substantially perpendicular to the L direction and extending along a principal surface of the inner electrode 2 is a width W direction, and the stacking direction of the inner electrodes 2 is a height or thickness T direction, the following are non-limiting examples of dimensions for the ceramic element body 10 of the monolithic ceramic capacitor 50 according to this preferred embodiment:

(a) L: 2.0 mm, W: 1.2 mm, T: 1.2 mm
(b) L: 1.6 mm, W: 0.8 mm, T: 0.8 mm
(c) L: 1.0 mm, W: 0.5 mm, T: 0.5 mm
(d) L: 0.6 mm, W: 0.3 mm, T: 0.3 mm
(e) L: 0.4 mm, W: 0.2 mm, T: 0.2 mm

Also, the ceramic element body 10 preferably has the rectangular or substantially rectangular-parallelepiped shape as described above. However, corner portions and ridge portions may be rounded with a predetermined curvature radius or smaller. The monolithic ceramic capacitor 50 according to this preferred embodiment also preferably includes the ceramic element body 10 which is chamfered by barrel grinding.

The material forming the dielectric layer 1 preferably includes dielectric ceramic containing, for example, $BaTiO_3$, $CaTiO_3$, $SrTiO_3$, or $CaZrO_3$ as the main constituent. Alternatively, the material forming the dielectric layer 1 may include a material in which a Mn compound, a Co compound, a Si compound, or a rare-earth compound is added as a sub-constituent to the above-described main constituent.

The inner electrodes 2 (2a, 2b) sandwiching the dielectric layer 1 alternately extend to the opposite end surfaces 3 (3a, 3b). One inner electrode 2a is connected to the outer electrode 5a located at one end surface 3a side of the ceramic element body 10, and the other inner electrode 2b is connected to the outer electrode 5b located at the other end surface 3b side of the ceramic element body 10.

The material of the inner electrodes 2 (2a, 2b) may include a metal, such as Ni, Cu, Ag, Pd, or Au, or an alloy containing at least one kind of these metals, for example, an alloy of Ag and Pd. In this preferred embodiment, Ni is preferably used for the forming material of the inner electrode.

Also, a stray inner conductor which is not electrically connected to the outer electrode may be provided on a further outer side portion of the inner electrode arranged at the outermost side portion. In this case, the stray inner conductor may be formed of the same material as the material of the inner electrode. If the stray inner conductor is provided, the stray inner conductor inhibits moisture from entering the ceramic element body from the outside of the ceramic element body and hence improves resistance to moisture.

Also, the outer electrodes 5 (5a, 5b) preferably include sintered metal layers 12 (12a, 12b) located on the ceramic element body 10 and containing Cu as the main constituent, and plated layers 32 (32a, 32b) arranged to cover the sintered metal layers 12 (12a, 12b).

Also, the plated layers 32 (32a, 32b) preferably are plated layers having two-layer structures including Ni-plated layers 33 (33a, 33b) located on the sintered metal layers 12 (12a, 12b), and Sn-plated layers 34 (34a, 34b) located on the Ni-plated layers 33 (33a, 33b).

The Ni-plated layers 33 (33a, 33b) define and function as barrier layers that provide a barrier against solder during mounting.

The Sn-plated layers 34 (34a, 34b) are provided to ensure wettability with respect to the solder during mounting.

Figure 3:
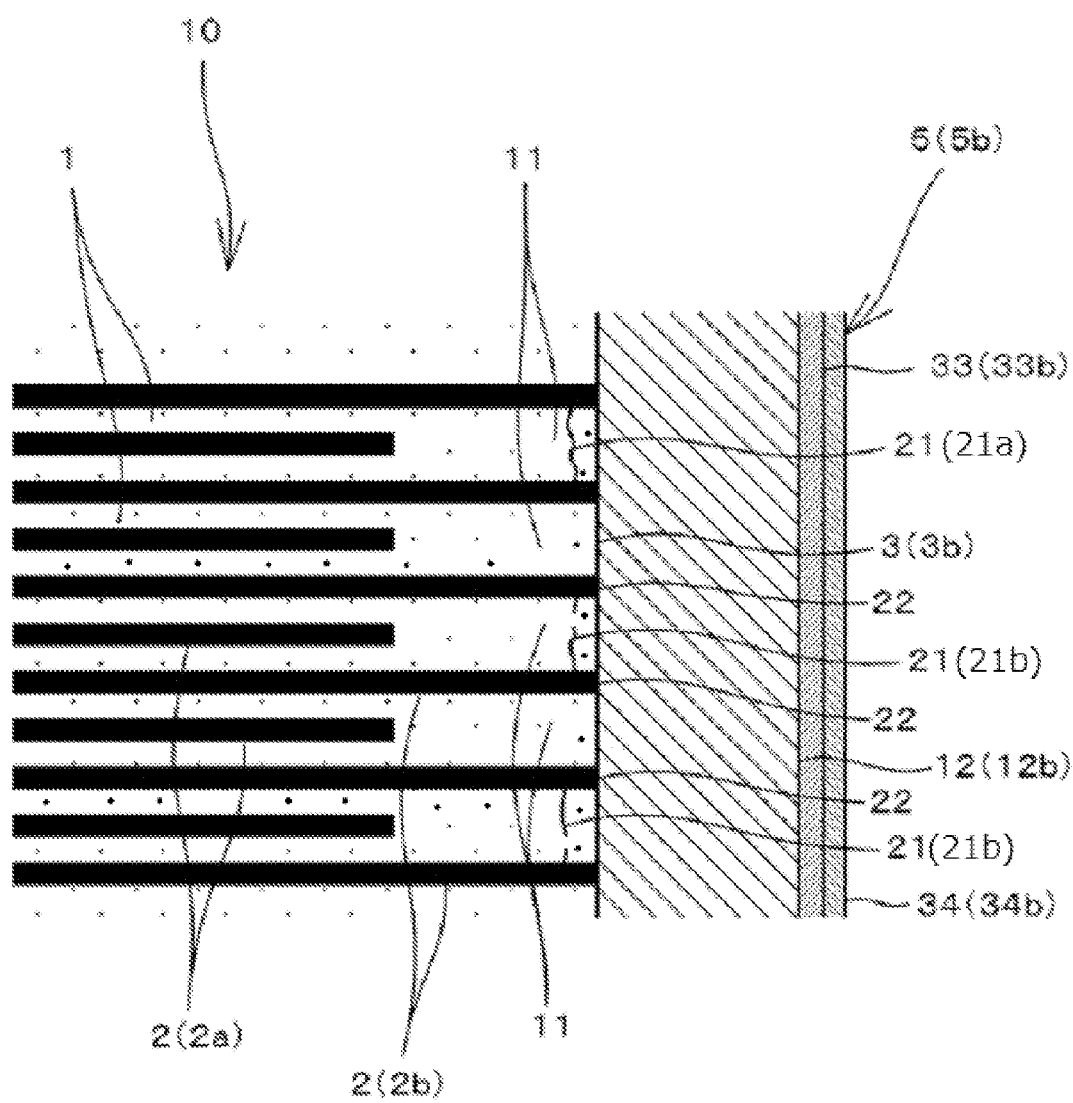
FIG. 3 is a cross-sectional view showing a primary portion of the monolithic ceramic capacitor in an enlarged manner according to a preferred embodiment of the present invention, in addition to FIG. 1.
Figure 4:
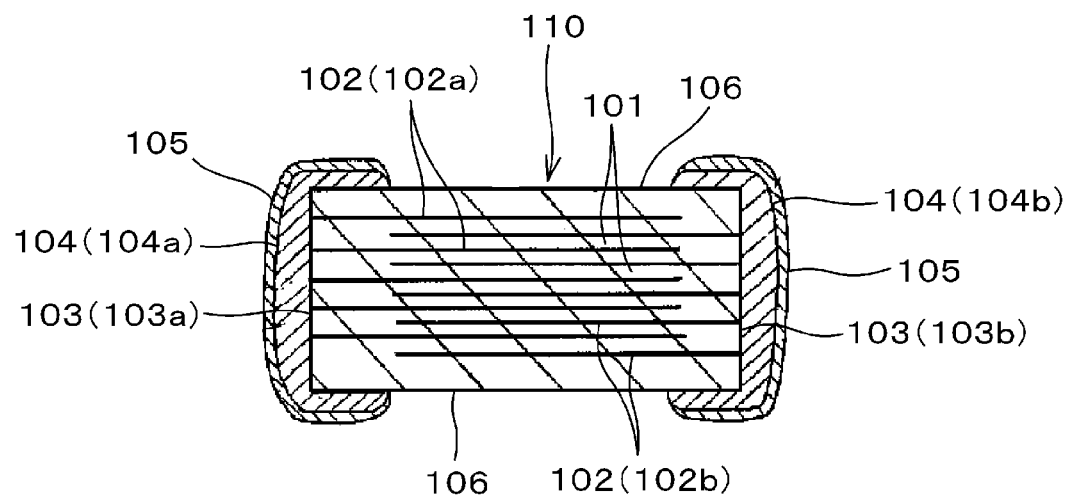
FIG. 4 is a front cross-sectional view showing a configuration of a monolithic ceramic capacitor according to related art.

In the monolithic ceramic capacitor 50, as shown in FIGS. 1 and 3, assuming a dielectric layer present or sandwiched between a pair of inner electrodes 2a and 2a, or 2b and 2b adjacent to each other in the stacking direction among a plurality of inner electrodes extending to one of the pair of end surfaces (3a, 3b) of the ceramic element body 10 is an inter-electrode dielectric layer 11, a gap 21 is preferably provided and extends with directionality in a direction connecting the inner electrodes 2a and 2a, or 2b and 2b sandwiching the inter-electrode dielectric layer 11.

The gap 21 preferably is present at a position near or adjacent to at least one of the pair of end surfaces 3a and 3b of the ceramic element body 10.

The gap 21 preferably is present in about 5% or more of inter-electrode dielectric layers 11 among a plurality of the inter-electrode dielectric layers 11 included in the ceramic element body 10.

In many cases, the gap 21 is preferably arranged parallel or substantially parallel to the end surface of the ceramic element body 10.

Figure 6A:
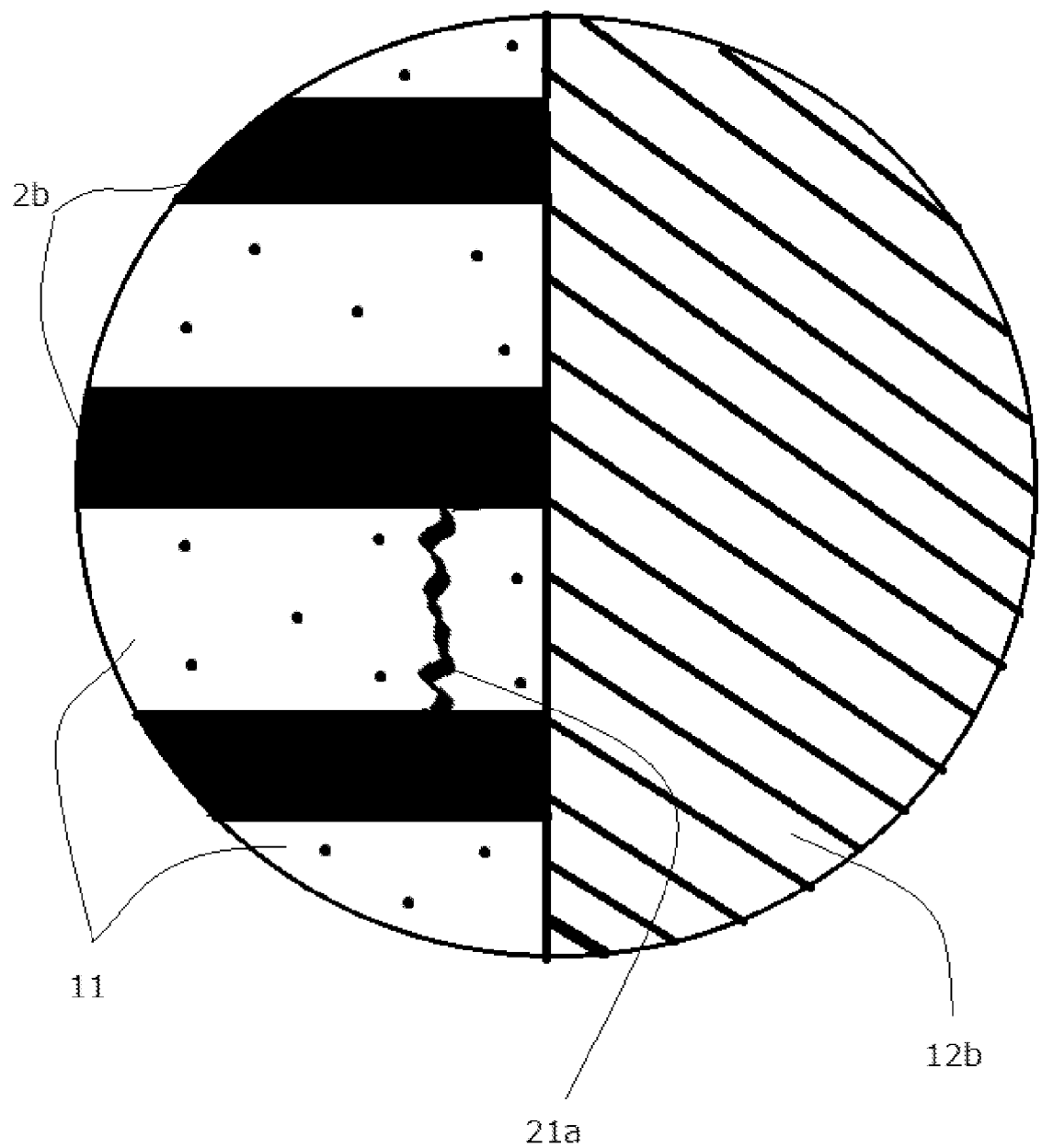
FIGS. 6A-6C are enlarged views of various portions of FIG. 3.

In one form of a gap 21a, the gap 21a preferably extends continuously in the direction connecting the adjacent inner electrodes 2a and 2a or connecting the adjacent inner electrodes 2b and 2b, such that the gap 21a passes entirely through the inter-electrode dielectric layer 11 located therebetween. In other words, the inter-electrode dielectric layer 11 is completely separated by the gap 21a extending entirely through the inter-electrode dielectric layer 11 so that the inter-electrode dielectric layer 11 is divided into a left portion and a right portion separated from each other along a direction connecting the pair of end surfaces as seen in FIGS. 3 and 6A.

Figure 6B:
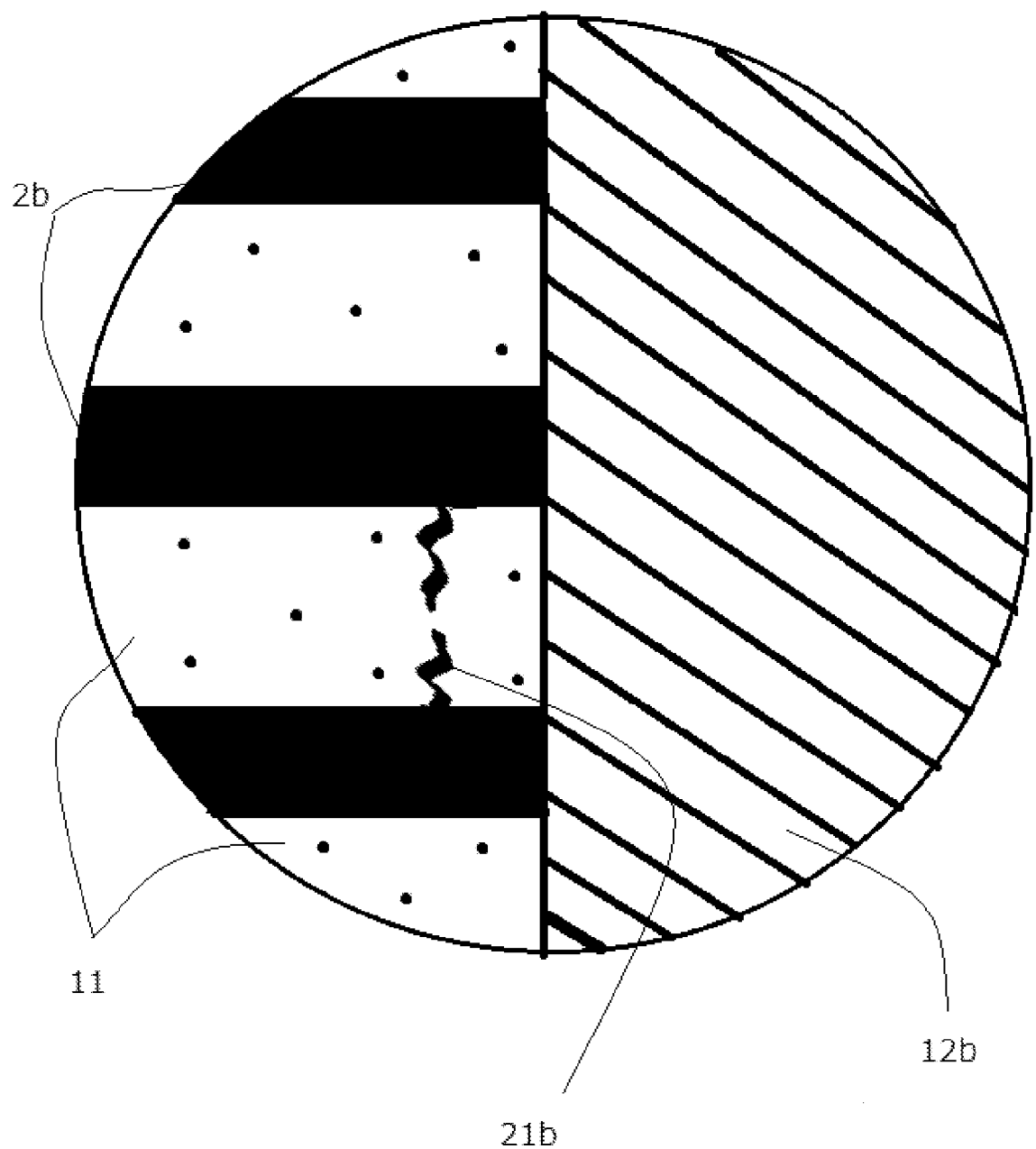

However, the gap 21 may not necessarily continuously extend between the adjacent inner electrodes 2a and 2a or between the adjacent inner electrodes 2b and 2b, and another form of gap 21b shown in FIGS. 3 and 6B may be disconnected or interrupted in this area. In other words, the inter-electrode dielectric layer is only partially separated by the gap 21b extending only partially and discontinuously through the inter-electrode dielectric layer 11 along the direction connecting the inner electrodes 2a or 2b sandwiching the inter-electrode dielectric layer 11.

Figure 6C:
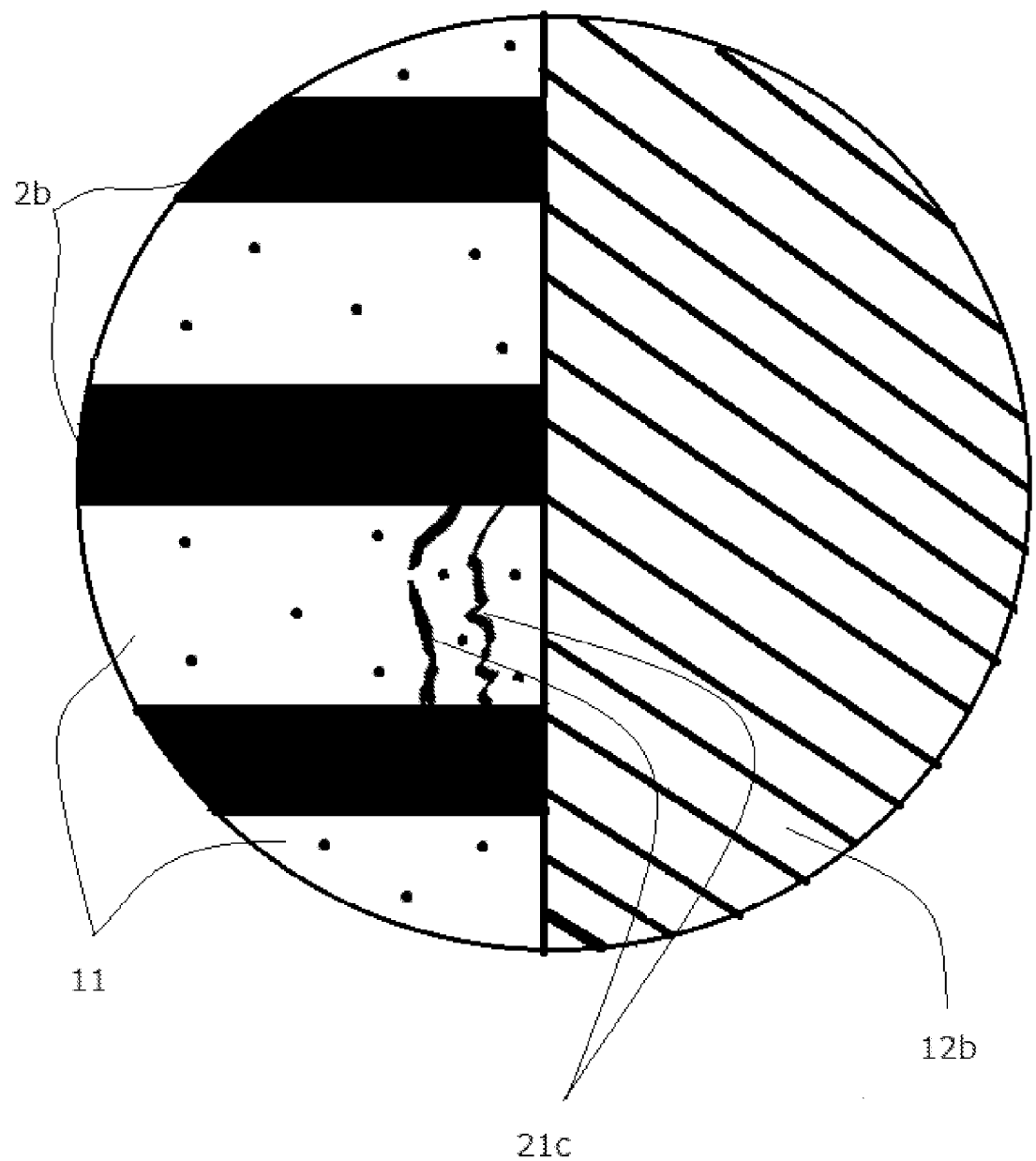

It possible that more than one gap 21a or 21b is formed and present in the same inter-electrode dielectric layer 11 as shown in FIG. 6C.

The gap 21 may be filled with air or a material of the inner electrodes 2 or outer electrodes 5, for example, Ni or an Ni—Cu alloy, for example.

The gap 21 preferably has a width extending in the length L direction (e.g., a direction perpendicular or substantially perpendicular to the direction connecting the inner electrodes 2a or 2b sandwiching the inter-electrode dielectric layer or along a length of the inter-electrode dielectric layer 11). The width of the gap 21 preferably is not less than about 0.2 μm and not more than about 2 μm, for example.

The thickness of the inter-electrode dielectric layers 11 is preferably, but not limited to, a range of about 1.5 μm to about 4 μm, for example.

In the present preferred embodiment of the present invention, about 5% or more of the inter-electrode dielectric layers among the plurality of inter-electrode dielectric layers 11 preferably include the gap 21, and about 5% to about 90% of the inter-electrode dielectric layers further preferably include the gap 21.

Also, the gap 21 in the direction connecting the inner electrodes 2 sandwiching the inter-electrode dielectric layer 11 is preferably located in an end-surface near or adjacent to a region of the ceramic element body 10, within about 10 μm from the end surface of the ceramic element body, for example.

In the monolithic ceramic capacitor 50 in this preferred embodiment having the above-described configuration, since the gap 21 in the direction connecting the inner electrodes is provided in the inter-electrode dielectric layer 11, the inner electrode 2 easily expands in the length direction (L direction) of the capacitor element body 10. Hence, expansion of the inner electrodes 2 in the stacking direction (T direction) and the width direction (direction perpendicular or substantially perpendicular to the direction in which the inner electrodes 2 extend or the W direction) is restricted or prevented.

In the monolithic ceramic capacitor of the related art, a crack is generated from a corner portion of the effective region, in which the plurality of inner electrodes are stacked with the ceramic layer and which contributes to generation of capacitance, to a corner portion of the ceramic element body due to expansion of the inner electrodes in the WT directions (width direction and thickness direction) of the ceramic element body. In contrast, in the present preferred embodiment of the present invention, such a crack is reliably prevented from being generated.

Next, a non-limiting example of a manufacturing method of this monolithic ceramic capacitor 50 is described.

First, a ceramic green sheet is manufactured by applying ceramic raw-material slurry containing ceramic powder in a substantially sheet-shaped configuration by die coating, gravure coating, or microgravure coating, and drying the ceramic raw-material slurry.

Then, conductive paste for forming the inner electrodes containing Ni powder as a conductive component is applied on a predetermined ceramic green sheet among a plurality of the manufactured ceramic green sheets in a predetermined pattern by screen printing, inkjet printing, or gravure printing, and hence an inner electrode pattern is formed.

Then, the ceramic green sheet with the inner electrode pattern formed and the ceramic green sheet without the inner electrode pattern (ceramic green sheet for outer layer) are stacked by a predetermined number of sheets in a predetermined order.

Then, the obtained multilayer block is pressed, and the respective ceramic green sheets are press-bonded. When the multilayer block is pressed, for example, a block to be press-bonded is sandwiched between resin films, and is pressed by a method such as hydrostatic pressing.

Then, the pressed multilayer press-bonded body is divided into substantially rectangular-parallelepiped-shaped chips (individual pieces) by using a method, such as press-cutting or cutting, and the chips are grinded by barrel grinding. The curvature radius of a corner portion and a ridge portion of each chip is preferably smaller than about 15 μm, for example.

The chips after the barrel grinding (individual pieces that become ceramic element bodies 10 (FIG. 1) after calcination) are heated at a predetermined temperature and a binder is removed. Then, for example, final calcination at about 900° C. to about 1300° C. is executed, and substantially rectangular-parallelepiped-shaped ceramic element bodies are obtained.

Then, conductive paste containing Cu powder as a conductive component is applied to both end surfaces of each ceramic element body (conductive paste which becomes a sintered metal layer forming an outer electrode after calcination).

When the conductive paste is applied, one end surface of the ceramic element body is immersed in conductive paste and raised while the other end surface of the ceramic element body is held by a holding jig, and hence the conductive paste is applied to the one end surface of the ceramic element body. Similarly, the conductive paste is applied to the other end surface of the ceramic element body.

At this time, the conductive paste may use, for example, conductive paste containing substantially spherical glass frits, substantially flat-shaped metal particles, a binder, and a solvent.

Then, the conductive paste applied to the one end portion and the other end portion of the ceramic element body as described above is heated at, for example, about 700° C., and the conductive paste is baked. Accordingly, the sintered metal layer is formed.

Alternatively, by applying the conductive paste to the chip (non-calcined chip) after the barrel grinding, and then calcining the chip, the sintering of the ceramic element body and the baking of the conductive paste may be simultaneously executed, and the sintered ceramic element body with the sintered metal layer may be formed.

Meanwhile, in a process of baking the conductive paste for forming the outer electrode, Cu in the outer electrode and Ni in the inner electrode are mutually diffused, and if the diffusion amount has the relationship of Cu>Ni, the volume of the inner electrode expands.

Then, when the expansion of the inner electrode progresses in the outer-electrode direction (L direction), and the stress caused by the expansion exceeds the intensity of the dielectric layer made of dielectric ceramic, a gap is generated in the dielectric layer. Then, as shown in FIGS. 1 and 3, the gap becomes the gap 21 in the direction connecting the inner electrodes 2a and 2a (or 2b and 2b) sandwiching the inter-electrode dielectric layer 11, the gap being generated at a position near at least one of the pair of end surfaces 3a and 3b of the ceramic element body 10, in the inter-electrode dielectric layer 11 sandwiched between the pair of inner electrodes in the stacking direction, among the plurality of inner electrodes extending to one of the pair of end surfaces of the ceramic element body.

In this case, if the gap 21 is generated in the direction connecting the inner electrodes 2a and 2a (or 2b and 2b) among the plurality of inner electrodes 2 extending to one of the pair of end surfaces 3 of the ceramic element body 10, expansion of the inner electrodes 2a and 2b is likely generated in the length direction (L direction) of the ceramic element body, and expansion in the width direction (W direction) and the height direction (T direction) is restricted or prevented by the amount of the expansion in the length direction (L direction). However, the gap 21 may possibly cause deterioration in reliability, and hence excessive generation of the gap 21 is required to be restricted.

As a method of causing the gap 21 to be likely generated in the direction connecting the inner electrodes 2a and 2a (or 2b and 2b) adjacent to each other in the stacking direction, a method of using glass (highly reactive glass) of a kind that forms an amorphous layer or a crystal layer is preferably used, for example.

By reaction between the glass and ceramic, the ceramic becomes brittle (tensile strength and flexural strength are decreased), and the gap becomes likely generated.

The glass may be blended in the ceramic green sheet used to form the dielectric layer, or may be blended in the conductive paste to form the outer electrode.

Also, a physical method for making ceramic brittle may be used by previously adding a mechanical shock to the ceramic. As a method of adding a mechanical shock, there is exemplified a method of inserting round stones and chips in a cylindrical container and rotating the cylindrical container.

Then, plating is executed in the order of Ni plating and Sn plating on the sintered metal layer, and thus the Ni-plated layer and the Sn-plated layer are formed.

To be specific, for example, a plurality of ceramic element bodies with the sintered metal layers provided are housed in a barrel with a plating solution, and electricity is applied while the barrel is rotated. Accordingly, the Ni-plated layer is formed on the sintered metal layer, and similarly the Sn-plated layer is formed on the Ni-plated layer.

Accordingly, the monolithic ceramic capacitor 50 according to the present preferred embodiment of the present invention having the structure shown in FIGS. 1 to 3 is obtained.

In the ceramic capacitor 50, the gap 21 in the direction connecting the inner electrodes 2a and 2a, or 2b and 2b sandwiching the inter-electrode dielectric layer 11 is present at the position near or adjacent to at least one of the pair of end surfaces 3a and 3b of the ceramic element body 10, in about 5% or more of the inter-electrode dielectric layers 11 among the plurality of inter-electrode dielectric layers 11. Accordingly, expansion of the inner electrodes 2 likely occurs in the length direction (L direction) of the ceramic element body, whereas expansion of the inner electrodes 2 in the width direction (W direction) and height direction (T direction) is restricted or prevented.

In the monolithic ceramic capacitor of the related art, a crack is generated from a corner portion of the effective region, in which the plurality of inner electrodes are stacked with the dielectric layer and which contributes to generation of capacitance, to a corner portion of the ceramic element body due to expansion of the inner electrodes in the WT directions (width direction and thickness direction) of the ceramic element body. In contrast, in the present preferred embodiment of the present invention, such a crack is reliably prevented from being generated. Also, a monolithic ceramic capacitor with high reliability is obtained.

To confirm the advantageous effects of various preferred embodiments of the present invention, as described below, a monolithic ceramic capacitor (sample) according to a non-limiting example including the features of various preferred embodiments of the present invention and a monolithic ceramic capacitor (sample) according to a comparative example not including the features of various preferred embodiments of the present invention were manufactured, and their characteristics were evaluated by measuring bending strength of each sample.

A Cu-sintered metal layer was formed on a ceramic element body including inner electrodes made of Ni and dielectric layers made of barium-titanate-based ceramic, and a Ni-plated layer and a Sn-plated layer were formed on the Cu-sintered metal layer. The number of the dielectric layers was 300 sheets.

The ceramic element body had a length L of 1.0 mm, a width W of 0.5 mm, and a height T of 0.5 mm.

Also, the distance between inner electrodes adjacent in the stacking direction (i.e., thickness of a dielectric layer) was 1.0 μm, and the thickness of an inner electrode was 1.0 μm. Further, the stacked number of inner electrodes was 350 layers. The thickness of the inter-electrode dielectric layer was about 2.0 μm.

Further, the maximum thickness of an extending portion of the sintered metal layer extending to a side surface of the ceramic element body was 28 μm.

Also, the Ni-plated layer formed on the sintered metal layer had a thickness of 3 μm, and the Sn-plated layer also had a thickness of 3 μm.

The above-described conditions were common to the respective monolithic ceramic capacitors of the comparative example and the example.

Then, as the monolithic ceramic capacitor according to the example, as shown in FIGS. 1 and 3, monolithic ceramic capacitors (samples with sample numbers 1 to 7 in Table 1 including the features of various preferred embodiments of the present invention) were manufactured. Each of the monolithic ceramic capacitors was configured such that, assuming a dielectric layer present between a pair of inner electrodes 2a and 2a, or 2b and 2b in a stacking direction among a plurality of inner electrodes extending to one of a pair of end surfaces 3a, 3b of a ceramic element body 10 is an inter-electrode dielectric layer 11, a gap 21 in a direction connecting the inner electrodes 2a and 2a (or 2b and 2b) sandwiching the inter-electrode dielectric layer 11 is present in about 5% to about 100% of inter-electrode dielectric layers among a plurality of inter-electrode dielectric layers 100 included in the ceramic element body 10.

Also, as the monolithic ceramic capacitor according to the comparative example, a monolithic ceramic capacitor not having the above-described gap 21 in any of inter-electrode dielectric layers 11 and not satisfying the requirements of the present invention (sample with sample number 8 in Table 1) was manufactured.

When each of the samples (monolithic ceramic capacitors) with sample numbers 1 to 7 was manufactured, a ceramic element body in a phase after calcination and before formation of an outer electrode was mixed and rotated with round stones for a predetermined time in a cylindrical container, thus a mechanical shock was added to the ceramic element body, and hence the above-described gap 21 was generated. By controlling the rotating time of the cylindrical container, the generation rate of the gap 21 in the plurality of inter-electrode dielectric layers 11 included in the ceramic element body 10 was controlled.

In the case of the sample according to the comparative example with the sample number of 8 in Table 1 (sample with no gap 21 generated), processing for promoting generation of the gap was not executed.

Then, for each sample manufactured as described above, the relationship between the generation rate of the gap 21 in the direction connecting the inner electrodes (see FIGS. 1 and 3) and the presence of generation of a crack from a corner portion of the effective region, in which the inner electrodes sandwich the inter-electrode dielectric layer and which contributes to generation of capacitance, to a corner portion of the ceramic element body was studied.

The generation rate of the gap in the direction connecting the inner electrodes was obtained by a method described below.

The sample after formation of the outer electrodes is grinded in parallel to a plane (LT plane) determined in the length direction L direction) and the height direction (T direction) to a center portion in the width direction (W direction), and the exposed grinded surface is observed by a scanning electron microscope (SEM) with magnification of 3000 times.

Then, as schematically shown in FIG. 3, if the gap 21 in the direction connecting adjacent inner electrodes 2 is found in the inter-electrode dielectric layer 11 located or sandwiched between the inner electrodes 2 in the stacking direction, at a position (the end-surface near region of the ceramic element body 10) corresponding to a position retracted from a tip end portion 22 of the inner electrode 2 extending to the end surface 3 of the ceramic element body 10 by about 2 μm or larger, the gap is called "a gap in a direction connecting inner electrodes."

Also, as shown in FIG. 3, based on a number B of the inter-electrode dielectric layers 11 in which the "gap in the direction connecting the inner electrodes" 21 is generated, with respect to a number A of the inter-electrode dielectric layers 11 present in a field of view, the generation rate of gaps in the direction connecting the inner electrodes is obtained with Expression (1) as follows:

$$\text{Generation rate(\%) of gap in direction connecting inner electrodes} = (B/A) \times 100 \quad (1).$$

Also, the presence of a crack to a corner portion of the ceramic element body (a crack to a corner of the ceramic element body) from a corner portion of the effective region, in which the inner electrodes sandwich the inter-electrode dielectric layer and which contributes to generation of capacitance, was studied by a method described below.

Figure 5:
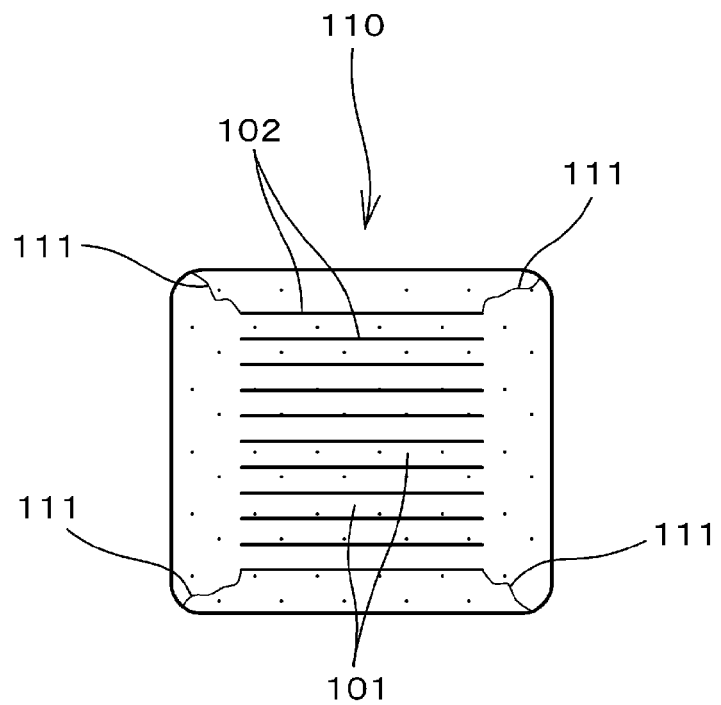
FIG. 5 is an illustration for describing a problem of the monolithic ceramic capacitor according to the related art.

The sample after formation of the outer electrodes is grinded in parallel to a plane (WT plane) determined in the width direction (W direction) and the height direction (T direction), to the effective region, in which the inner electrode extending to one end surface of the ceramic element body and the inner electrode extending to the other end surface of the ceramic element body are overlaid, and the exposed grinded end surface is observed by a metal microscope (magnification: 1000 times). Then, a sample in which a crack from a corner portion of the effective region to a corner portion of the ceramic element body 10 (a crack corresponding to the crack 111 in FIG. 5 describing the problem of the monolithic ceramic capacitor of the related art) is recognized, "present (x)" is determined for generation of "a crack to a corner of the ceramic element body," and for a sample in which "a crack to a corner of the ceramic element body" is not recognized, "none (○)" is determined.

Also, for each sample, a reliability test was performed under conditions of 85° C., RH 85%, and 1 WV. Characteristics were checked when 1000 hours elapsed and when 2000 hours elapsed. A sample the characteristics of which have been satisfied until 1000 hours was evaluated as good (○), and a sample the characteristics of which have been satisfied until 2000 hours was evaluated as very good (◉).

Also, Table 1 shows the results of overall evaluation. According to the overall evaluation, a sample was determined as very good (◉) if generation of "a crack to a corner of the ceramic element body" was not recognized and the result of the reliability evaluation was very good (◉). A sample was determined as good (○) if generation of "a crack to a corner of the ceramic element body" was not recognized, but the result of the reliability evaluation was good (○).

Table 1 collectively shows the generation rate of a gap in the direction connecting the inner electrodes, presence of a crack to a corner of the ceramic element body, the result of the reliability evaluation, and the result of overall evaluation, studied as described above.

TABLE 1

| Sample No. | Gap generation rate in direction connecting adjacent inner electrodes | Presence of crack to corner portion | Reliability evaluation | Overall evaluation |
|---|---|---|---|---|
| 1 | 5% | None (○) | ◉ | ◉ |
| 2 | 10% | None (○) | ◉ | ◉ |
| 3 | 20% | None (○) | ◉ | ◉ |
| 4 | 50% | None (○) | ◉ | ◉ |
| 5 | 80% | None (○) | ◉ | ◉ |
| 6 | 90% | None (○) | ◉ | ◉ |
| 7 | 100% | None (○) | ○ | ○ |
| 8 | 0% | Present (x) | ◉ | x |

As shown in Table 1, in a case of the sample according to the comparative example with the sample number 8, in which the generation rate of a gap in the direction connecting the inner electrodes sandwiching the inter-electrode dielectric layer was 0%, generation of a crack to a corner of the ceramic element body was recognized, and hence it was ensured that the sample was not preferable.

In contrast, in a case of each of the monolithic ceramic capacitors (samples with the sample numbers 1 to 7), the generation rate of a gap in the direction connecting the inner electrodes adjacent through the inter-electrode dielectric layer was about 5% or higher, generation of a crack to a corner of the ceramic element body was not recognized.

However, in a case of the sample with the sample number 7, being a sample with a 100% generation rate of a gap in the direction connecting the adjacent inner electrodes, it was recognized that the reliability evaluation tended to be lowered.

Consequently, it was discovered that the generation rate of a gap in the direction connecting the adjacent inner electrodes is preferably about 90% or lower, for example.

The present invention is not limited to the above-described preferred embodiments, and various applications and modifications are possible within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A monolithic ceramic capacitor comprising:
a ceramic element body including:
a plurality of dielectric layers made of dielectric ceramic; and
a plurality of inner electrodes stacked with the dielectric layers in a stacking direction; wherein adjacent ones of the plurality of inner electrodes with one of the plurality of dielectric layers disposed therebetween in the stacking direction alternately extend to a pair of mutually opposite end surfaces of the ceramic element body; and
a pair of outer electrodes arranged on outer surfaces of the ceramic element body and electrically connected to respective ones of the inner electrodes; wherein one of the plurality of dielectric layers present between a pair of the inner electrodes in the stacking direction extending to one of the pair of end surfaces of the ceramic element body is an inter-electrode dielectric layer; and a gap is provided in the inter-electrode dielectric layer and extends in a direction connecting the pair of the inner electrodes with the inter-electrode dielectric layer located therebetween;

wherein the gap is located at a position near or adjacent to at least one of the pair of the end surfaces of the ceramic element body, in about 5% or greater of inter-electrode dielectric layers among a plurality of the inter-electrode dielectric layers included in the ceramic element body.

2. The monolithic ceramic capacitor according to claim 1, wherein two or more gaps are present in the same inter-electrode dielectric layer.

3. A monolithic ceramic capacitor comprising:
a ceramic element body including:
    a plurality of dielectric layers made of dielectric ceramic; and
    a plurality of inner electrodes stacked with the dielectric layers in a stacking direction; wherein
    adjacent ones of the plurality of inner electrodes with one of the plurality of dielectric layers disposed therebetween in the stacking direction alternately extend to a pair of mutually opposite end surfaces of the ceramic element body; and
a pair of outer electrodes arranged on outer surfaces of the ceramic element body and electrically connected to respective ones of the inner electrodes; wherein
one of the plurality of dielectric layers present between a pair of the inner electrodes in the stacking direction extending to one of the pair of end surfaces of the ceramic element body is an inter-electrode dielectric layer; and
a gap extending in a direction connecting the pair of the inner electrodes with the inter-electrode dielectric layer located therebetween is located at a position within a distance of about 10 μm from at least one of the pair of the end surfaces of the ceramic element body in about 5% to about 90% of inter-electrode dielectric layers among a plurality of the inter-electrode dielectric layers included in the ceramic element body.

4. The monolithic ceramic capacitor according to claim 3, wherein two or more gaps are present in the same inter-electrode dielectric layer.

5. A monolithic ceramic capacitor comprising:
a ceramic element body including:
    a plurality of dielectric layers made of dielectric ceramic; and
    a plurality of inner electrodes including Ni and stacked with the dielectric layers in a stacking direction; wherein
    adjacent ones of the plurality of inner electrodes with one of the plurality of dielectric layers disposed therebetween in the stacking direction alternately extend to a pair of mutually opposite end surfaces of the ceramic element body; and
a pair of outer electrodes including Cu, arranged on outer surfaces of the ceramic element body and electrically connected to respective ones of the inner electrodes; wherein
a number of the plurality of dielectric layers is between 200 and 400;
Cu included in the outer electrodes is diffused in the Ni included in the inner electrodes at a position near or adjacent to at least one of the pair of end surfaces of the ceramic element body;
one of the plurality of dielectric layers present between a pair of the inner electrodes in the stacking direction extending to one of the pair of end surfaces of the ceramic element body is an inter-electrode dielectric layer;
a thickness of inter-electrode dielectric layer is about 1.5 μm to about 4 μm at a position near or adjacent to at least one of the pair of end surfaces of the ceramic element body; and
a gap extending in a direction connecting the pair of the inner electrodes with the inter-electrode dielectric layer located therebetween is located at a position within a distance of about 10 μm from at least one of the pair of the end surfaces of the ceramic element body in about 5% to about 90% of inter-electrode dielectric layers among a plurality of the inter-electrode dielectric layers included in the ceramic element body.

6. The monolithic ceramic capacitor according to claim 5, wherein two or more gaps are present in the same inter-electrode dielectric layer.

* * * * *